Nov. 25, 1958 F. E. BONNER 2,862,076
SPEED SIGNAL DEVICE
Filed Nov. 30, 1956 2 Sheets-Sheet 1

INVENTOR.
FRANK E. BONNER
BY Toulmin & Toulmin
ATTORNEYS

Nov. 25, 1958 F. E. BONNER 2,862,076
SPEED SIGNAL DEVICE

Filed Nov. 30, 1956 2 Sheets-Sheet 2

*INVENTOR.*
FRANK E. BONNER
BY Toulmin & Toulmin

ATTORNEYS

United States Patent Office 2,862,076
Patented Nov. 25, 1958

2,862,076

SPEED SIGNAL DEVICE

Frank E. Bonner, Dayton, Ohio, assignor to The Commonwealth Engineering Company of Ohio, Dayton, Ohio, a corporation of Ohio Application November 30, 1956, Serial No. 625,387

1 Claim. (Cl. 200—82)

My present invention relates to speed indicating devices and more particularly to speed warning mechanisms for automotive vehicles.

In the usual automotive speedometers there is provided a dial which is calibrated in miles per hour; a pointer sweeps over the dial in the operation of the vehicle to indicate the speed of the vehicle. Such a speedometer is driven through a flexible cable, which cable is associated with the running gear of the vehicle.

An important object of the present invention is to provide a speed warning system which is operable through the usual flexible cable of the automobile speedometer, or which system may, if desired, be operated through an independent flexible cable.

A principal object of the invention is to provide a speed warning system which may function in cooperation with visual indicators, sound indicators, or other warning devices.

Still another object of the invention is to provide a speed warning system which is simple in construction, composed of a few simple parts, which device is readily installable in substantially all models of automotive vehicles, which is positive and accurate in operation, is of relatively small size and weight, and which is so constructed as to preclude the liability of derangement of the same.

These and other allied objectives of the invention will become apparent from the following detailed description and accompanying drawings wherein.

Figures 5, 6:
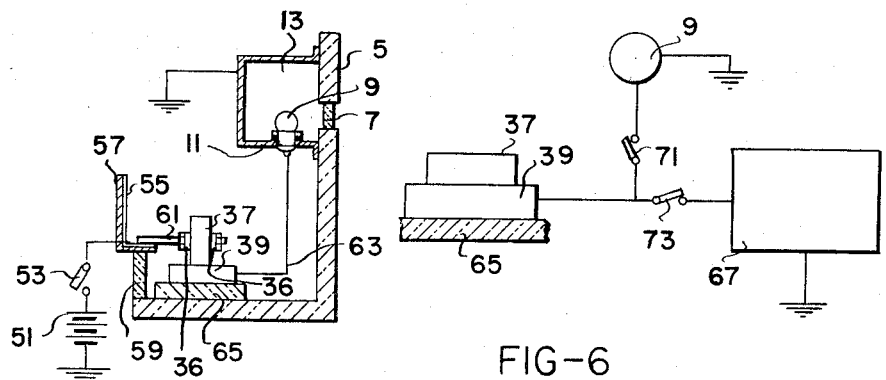
Figure 5 is a view partially in section illustrating the relationship of a visual indicator to its associated electrical circuitry.
Figure 7:
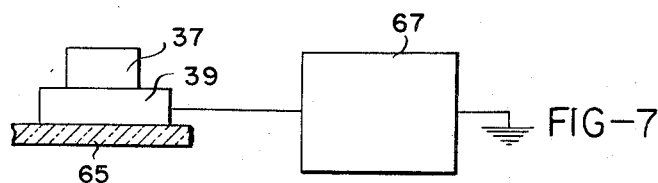

Figure 6 schematically illustrates one embodiment of the invention adapted for sound indication; and Figure 7 illustrates another embodiment of the invention adapted for sound indication.

Generally speaking, in the operation of the speed warning system of this invention a hydraulic pump actuated by a flexible cable, which is the speedometer cable, is utilized to pressure actuate an indicating system.

Figure 1:
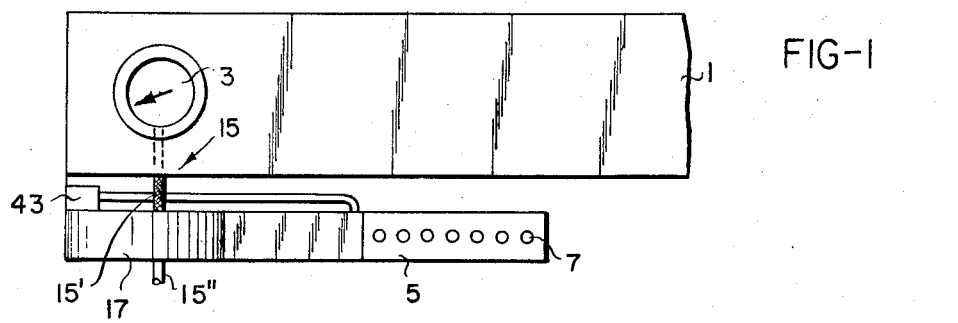
Figure 1 is a fragmentary front elevational view of an automobile dash-board having a speed warning system of this invention mounted in conjunction therewith.

Referring to the drawings, the numeral 1 in Figure 1 indicates a fragment of the dash-board of an automobile having the usual speed indicating dial 3. Below the dash-board 1 there is mounted a casing 5, which is suitably of plastic or other insulating material. The casing 5 is provided with a plurality of apertures 7 which are arranged to be visually inspected conveniently by the operator of the vehicle. Behind each aperture 7 (Figure 5) there is a light bulb 9 which is mounted in a bayonet type base in frame 11. A plurality of the lights 9 are separated from each other by a plurality of vertically extending panels 13 of the frame 11 to prevent the passage of light between the compartments housing the light bulbs.

Figure 3:
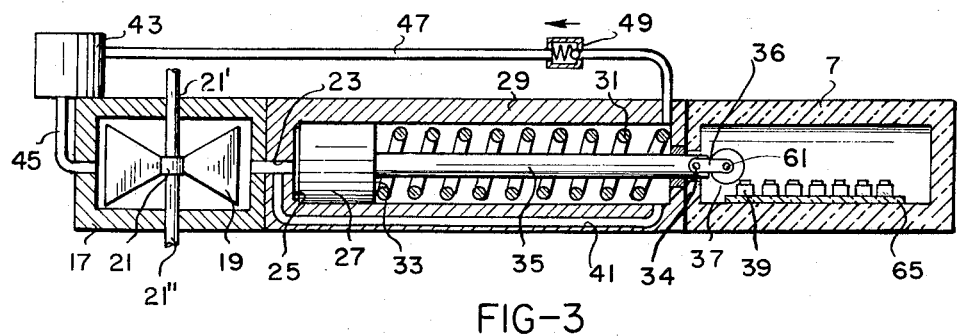
Figure 3 is a schematic view illustrating the main operating components of the structure of invention.
Figure 2:
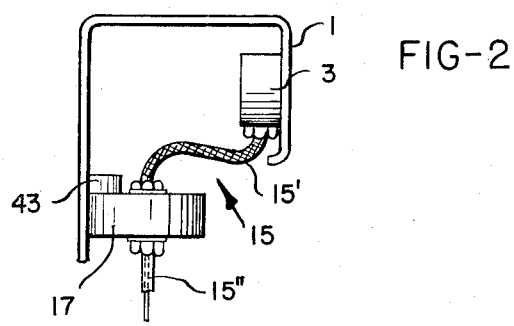
Figure 2 is a slide elevational view of the structure of Figure 1.

Referring now again to Figure 1, the numeral 15 generally indicates a flexible cable which normally actuates the speedometer 3. In the present instance the cable 15 is in two portions, an upper portion indicated at 15' and a lower portion indicated at 15". The numeral 17 designates the housing of a centrifugal hydraulic pump, which pump, as shown most clearly in Figure 3, is provided with vanes 19 carried on shaft 21.

Shaft 21 has an upper portion 21' which is coupled to the portion 15' of the flexible cable. Similarly the lower portion 21" of shaft 21 is coupled to the portion 15" of the flexible cable 15. Accordingly when the cable 15 is actuated from the running gear (not shown) of the automobile in the usual manner, shaft 21 and its vanes 19 will be driven in rotation in the direction indicated by the arrow in Figure 4.

Pump housing 17 has an outlet indicated at 23 which communicates with the pump with a cylindrical spacing 25 in which there is positioned for rectilineal movement a piston 27. A housing 29 which may be an extension of the housing 17, or which may be connected thereto in any suitable manner, surrounds the piston 27 to from a cylinder therefor. Within the cylinder there is positioned a spring 31 which engages at one end against piston end 33 of the piston 27 and engages at the other end against the housing 29. A piston rod 35 carried by the piston, as shown in Figure 3, passes through the spring 31 and carries on its outer end a contact element suitably in the form of a roller 37 which is adapted to make successive electrical connections with a plurality of contacts 39. Element 37 is provided in electrically insulated relation with piston rod 35 by arms 36 of electrically insulating material, for example, Bakelite. The arms are supported on pin 34 which extends through piston rod 35 and shaft 61 to be referred to more particularly hereinafter.

Extending from the port 23 to the right hand end of the cylinder 25 is a conduit 41. Thus the housing 17 is in communication with the right hand end of the housing 29.

Leftwardly, as shown in Figure 3, there is provided a reservoir 43 of oil which is communicable with the housing 17 through the conduit 45. Also the reservoir 43 is communicable through conduit 47 and check valve 49 with the right hand end of the cylinder housing 29. Check valve 49 normally serves to prevent the flow of oil to the reservoir 43 from the cylinder, but upon development of a high pressure valve 49 opens to permit flow from the cylinder to the reservoir through the valve.

The contacts 39 may be of any desired spacing and may themselves be of any desired length for traverse by the roller 37. However, the contact should be of such length and so spaced that the roller 37, when it has once left its normal position (Figure 3) will always be in contact with one only of the contacts 39.

Figure 4:
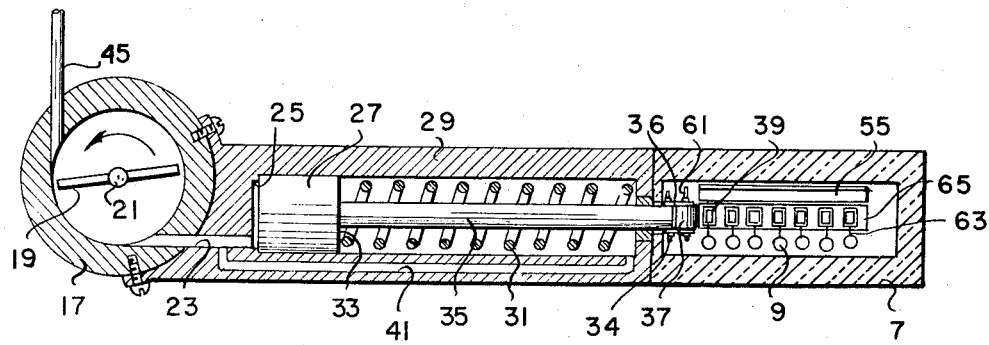
Figure 4 is a plan view of the structure of Figure 3 shown in cooperation with a portion of the visual indicating system of Figure 1.

Referring now to Figure 5, the numeral 51 indicates a battery, one side of which is grounded and the other side of which is connected through a switch 53 to a longitudinally extending conductor 55 (Figure 4). The conductor 55 is suitably mounted on a block of insulating material 57, which is itself supported either from the casing 5 or from other insulating material as indicated at 59.

The roller 37 carries a shaft portion 61, which shaft portion is in contact with the conductor 55 to form an electrical connection between the conductor and the roller. Each of the contacts 39 is connected by a lead as at 63 at one side of the bulb 9, the other side of the bulb being grounded through the frame 11. Accordingly, when switch 53 is in closed position and the roller traverses the contacts lights will be successively illuminated as the roller traverses. The contacts 39 are themselves either supported directly from the casing 5 when the same is of insulating material, or from insulating block 65 beneath the contacts.

As indicated schematically in Figure 6 a sound system designated by the numeral 67 may be placed in parallel with the bulb 9. Switches 71 may be placed in series with the bulbs 9. Also, a switch 73 may be placed in series with the sound system. These systems 71 and 73 permit utilization of either system or both systems, as desired. As shown in Figure 7, the sound system 67 alone may be employed, if such is preferred.

Summarizing, in the operation of the device, the cable 15" drives the vanes 19 of the pump to develop pressure in the port 23 which urges the piston 27 and the contact roller 37 over the contacts 39. The pressure developed on the face of the piston 27 of greater area is balanced by the combination of the compression force exerted by spring 31 and the fluid pressure on the face of the piston of lesser area.

Compression of the spring 31 effects the balancing and provides for positive positioning of the roller 37 by limiting piston displacement, and since the position at any given time reflects the pressure in the pump, which is itself governed by the speed of the vehicle, the speed will be appropriately indicated by the illumination of lights at 9.

Each of the lights, as indicated in Figure 1, may have associated therewith a definite speed in order that the operator may be able to be conveniently warned of the vehicle speed. Preferably the indicia are in miles per hour and the value of the indicia increases from left to right as in Figure 1.

The device is a compact unit, may be readily installed in substantially all modern vehicles for convenient reading by the vehicle operator. As will be noted in the specific embodiment described, it is only necessary to interrupt the flexible cable 15 and to secure the ends of the same to the shaft 21 of the pump.

It is to be noted that the fluid filled system is utilized and that when intially manufactured it is preferable to completely fill the system and then to drain out some slight amount of oil to provide a partial vacuum in the line 47. Accordingly the system provides for expansion of the oil due to ambient temperature by development of heat in the pump.

The valve 49 in line 47 as already noted is not normally operable by the pressures developed. It functions however as a safety should the pressure in the system rise unduly.

It will be understood that this invention is susceptible to modification in order to adapt it to different usages and conditions and accordingly, it is desired to comprehend such modifications within this invention as may fall within the scope of the appended claim.

I claim:

In a speed warning device for automative vehicles, the combination with a speedometer and driving cable means therefor, a centrifugal pump, a housing, a cylinder disposed in said housing, a piston reciprocable in the cylinder, a reservoir for fluid, conduit means connecting said reservoir with said pump, a passage in one end of the housing connecting said pump to said cylinder for imposing the fluid pressure of the pump against the face of said piston, a conduit disposed in the housing means and connecting said pump to the other end of the cylinder for imposing fluid pressure developed by said pump on the opposite face of said piston, an additional conduit and including a check valve and connecting said fluid reservoir with said other end of the cylinder, said check valve normally serving to prevent the flow of fluid to the reservoir from the cylinder under relatively low fluid pressure, a piston rod, a coil spring surrounding said piston rod and arranged to urge the piston to move toward said pump and against the action of the fluid pressure developed by said pump, said piston rod projecting outwardly of the housing means, a roller contact element mounted on the outer end of said piston rod and in electrically insulated relation therewith, a plurality of spaced electrically insulated contact members arranged to be sequentially traversed by said roller element upon movement of said piston rod, means to energize said contact element electrically, and means for drivingly connecting said pump to said speedometer driving means for simultaneously actuating both the speedometer and said centrifugal pump.

References Cited in the file of this patent

UNITED STATES PATENTS

| | | |
|---|---|---|
| 1,025,559 | Bliss | May 7, 1912 |
| 1,045,647 | Wallace | Nov. 26, 1912 |
| 1,149,042 | Goldstein et al. | Aug. 3, 1915 |
| 1,569,223 | Gore | Jan. 12, 1926 |
| 1,679,212 | Forman | July 31, 1928 |
| 2,523,666 | Moth | Sept. 26, 1950 |